US012689921B2

(12) United States Patent
Voodem et al.

(10) Patent No.: US 12,689,921 B2
(45) Date of Patent: Jul. 21, 2026

(54) NETWORK REPOSITORY FUNCTION AND PRODUCER OPERATIONS IN A STANDALONE NETWORK ARCHITECTURE

(71) Applicant: T-MOBILE INNOVATIONS LLC, Overland Park, KS (US)

(72) Inventors: Suryaprakash Reddy Voodem, Bothell, WA (US); Swetha Gopisetti, Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 353 days.

(21) Appl. No.: 18/340,660

(22) Filed: Jun. 23, 2023

(65) Prior Publication Data

US 2024/0430717 A1     Dec. 26, 2024

(51) Int. Cl.
*H04W 24/08* (2009.01)
*H04L 67/142* (2022.01)
(Continued)

(52) U.S. Cl.
CPC ........... *H04W 24/08* (2013.01); *H04L 67/142* (2013.01); *H04L 67/51* (2022.05); *H04L 69/40* (2013.01); *H04W 4/50* (2018.02)

(58) Field of Classification Search
CPC ....... H04L 69/40; H04L 67/51; H04L 67/142; H04W 24/08; H04W 4/50
See application file for complete search history.

(56) References Cited

U.S. PATENT DOCUMENTS 11,616,711 B1 *   3/2023   Cakulev .............. H04L 41/5058
                                                              709/224
11,765,064 B1 *   9/2023   Pandey ............... H04L 43/0817
                                                              709/224

(Continued)

FOREIGN PATENT DOCUMENTS

CN        116208989 A   *  6/2023   ............ H04W 24/04
WO      2022/083867 A1     4/2022

OTHER PUBLICATIONS

Technical Specification, ETSI, Jul. 2022, https://www.etsi.org/deliver/etsi_ts/129500_129599/129510/17.06.00_60/ts_129510v170600p.pdf (accessed Sep. 25, 2023) (330 pages).

(Continued)

*Primary Examiner* — Angela Widhalm De Rodriguez
(74) *Attorney, Agent, or Firm* — SHOOK, HARDY & BACON L.L.P.

(57)                ABSTRACT
The technology described herein relates to Security Operations Center (SOC) operations in a standalone architecture. In embodiments, the SOC comprises a producer that communicates with a first Network Repository Function (NRF) and a second NRF over a network repository function service-based interface. In embodiments, the producer (e.g., a Session Management Function, a Policy Control Function) can monitor heartbeats received from the first NRF and the second NRF. The first NRF, in some embodiments, can transmit a notification to the producer indicating that the first NRF is out-of-service. In some embodiments, the first NRF can also transmit another notification to the producer that indicates the first NRF is in-service. Based on the producer receiving the notification that the first NRF is out-of-service, the producer can suspend the monitoring of the heartbeats sent by the first NRF.

20 Claims, 3 Drawing Sheets

(51) Int. Cl.
_H04L 67/51_ (2022.01)
_H04L 69/40_ (2022.01)
_H04W 4/50_ (2018.01)

(56) References Cited

U.S. PATENT DOCUMENTS

| | | | | |
|---|---|---|---|---|
| 2020/0296606 | A1* | 9/2020 | Mendoza | H04L 41/12 |
| 2022/0240171 | A1* | 7/2022 | Singh | H04W 48/18 |
| 2022/0279023 | A1* | 9/2022 | Solari | H04W 12/069 |
| 2023/0007536 | A1* | 1/2023 | Sharma | H04W 28/088 |
| 2023/0032054 | A1* | 2/2023 | Jayaramachar | H04W 8/00 |
| 2023/0113082 | A1* | 4/2023 | Sabeur | H04L 65/1045 |
| | | | | 455/435.1 |
| 2023/0413214 | A1* | 12/2023 | Khare | H04L 43/10 |

OTHER PUBLICATIONS

3GPP: "3rd Generation Partnership Project; Technical Specification Group Core Network and Terminals; 5G System: Network Function Repository Services; Stage 3 (Release 16)", #GPP Standard, #GPP TS 29.510, V16.14.0, Mar. 2023, 220 pages.
Extended European Search Report received for European Application No. 24182957.1, mailed on Nov. 29, 2024, 9 pages.

\* cited by examiner

300

MEMORY

304

PROCESSOR(S)

306

PRESENTATION
COMPONENT(S)

308

RADIO(S)

316

302

I/O PORT(S)

310

I/O COMPONENTS

312

POWER SUPPLY

314

NETWORK REPOSITORY FUNCTION AND PRODUCER OPERATIONS IN A STANDALONE NETWORK ARCHITECTURE

SUMMARY

A high-level overview of various aspects of the technology disclosed herein is provided here for that reason, to provide an overview of the disclosure and to introduce a selection of concepts that are further described in the Detailed Description section below. This Summary is not intended to identify key features or essential features of the claimed subject matter, nor is it intended to be used as an aid in isolation to determine the scope of the claimed subject matter. The present disclosure is directed, in part, to systems and methods corresponding to security operations center (SOC) operations in a standalone architecture, substantially as shown in and/or described in connection with at least one of the figures, and as set forth more completely in the claims.

In aspects set forth herein, and at a high level, the systems, methods, media, etc. disclosed herein correspond to system operations (e.g., operations of a producer that communicates with a first Network Repository Function (NRF) and a second NRF over a network repository function service-based interface, operations of the first NRF, operations of the second NRF, operations of another NRF, operations of another producer). In embodiments, the producer has the capability to monitor heartbeats sent by the first NRF (e.g., based on a registration of the first NRF), heartbeats transmitted by the second NRF, heartbeats transmitted by another NRF, or one or more combinations thereof. In embodiments, the first NRF, the second NRF, or the other NRF, can transmit, over the network repository function service-based interface, a notification that the corresponding NRF is out-of-service. In some embodiments, the first NRF, the second NRF, or the other NRF, can transmit, over the network repository function service-based interface, another notification that the corresponding NRF is in-service (i.e., indicating that the corresponding NRF is now operational).

For example, based on the producer receiving the notification that the particular NRF is out-of-service, the producer can suspend (e.g., temporarily cease or pause for a predetermined amount of time or an indefinite amount of time) the monitoring of the heartbeats transmitted by that NRF. Additionally or alternatively, the producer can also resume the monitoring of the heartbeats transmitted by that NRF (after the suspension of the monitoring) based on receiving the other notification that the corresponding NRF is in-service (i.e., the other notification indicating that the corresponding NRF is now operational). In some embodiments, the producer can relay the notification that the particular NRF is out-of-service to another producer. It is also possible, in some embodiments, for the particular NRF transmitting the out-of-service notification to transmit the out-of-service notification to a plurality of producers (e.g., two or more producers).

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
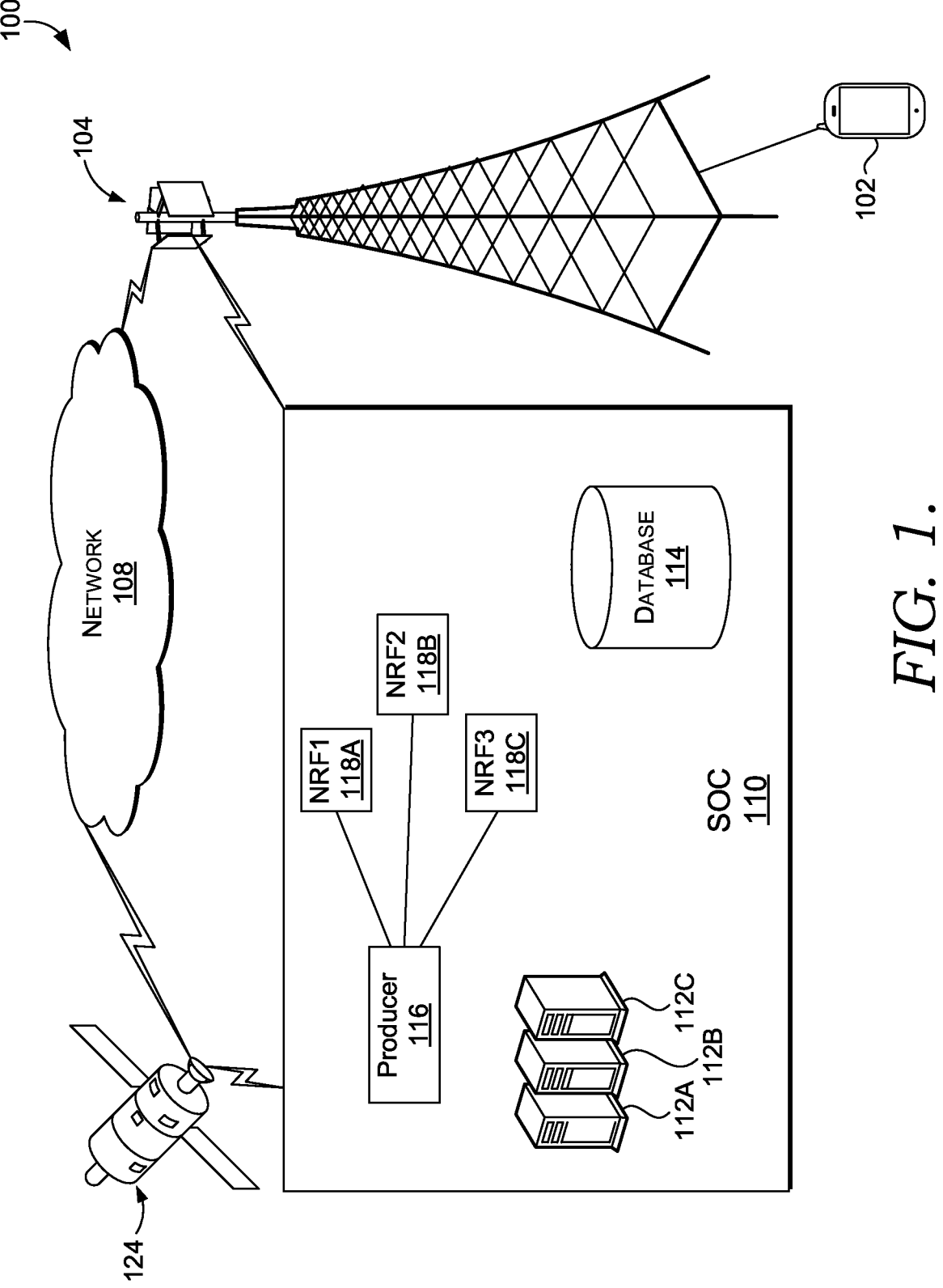
FIG. 1 depicts an example operating environment corresponding to the security operations center (SOC) operations in the standalone architecture, in accordance with embodiments herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Cellular Communication System |
| 4G | Fourth-Generation Cellular Communication System |
| 5G | Fifth-Generation Cellular Communication System |
| 6G | Sixth-Generation Cellular Communication System |
| AF | Application Function |
| AMF | Access and Mobility Management Function |
| AOA | Angle of Arrival |
| API | Application Programming Interface |
| AUSF | Authentication Server Function |
| CA | Carrier Aggregation |
| CD-ROM | Compact Disk Read Only Memory |
| CDMA | Code Division Multiple Access |
| CHF | Charging Function |
| DVD | Digital Versatile Discs |
| EEPROM | Electrically Erasable Programmable Read Only Memory |
| EMF | Electromagnetic Field |
| EMS | Enhanced Messaging Service |
| eNB | Evolved Node B |
| Ev-DO | Evolution-Data Optimized |
| FD-MIMO | Full-Dimension Multiple-Input Multiple-Output |
| gNB | Next Generation Node B |
| GPRS | General Packet Radio Service |
| GSM | Global System for Mobile communications |
| HSS | Home Subscriber System |
| IEEE | Institute of Electrical and Electronics Engineers |
| INS | In-Service |
| IP | Internet Protocol |
| LTE | Long Term Evolution |
| MAC | Media Access Control |
| MIMO | Multiple-Input Multiple-Output |
| MME | Mobility Management Entity |
| MMS | Multimedia Messaging Service |
| MU-MIMO | Multi-User Multiple-Input Multiple-Output |
| NEF | Network Exposure Function |
| NF | Network Function |
| NR | New Radio |

-continued

| NRF | Network Function Repository Function |
| OOR | Out-of-Reach |
| OOS | Out-of-Service |
| OTDOA | Observed Time Difference of Arrival |
| PC | Personal Computer |
| PCC | Policy and Charging Control |
| PCF | Policy Control Function |
| PDA | Personal Digital Assistant |
| PDU | Packet Data Unit |
| PLMN | Public Land Mobile Network |
| RAM | Random Access Memory |
| RAN | Radio Access Node |
| RF | Radio-Frequency |
| ROM | Read Only Memory |
| RRC | Radio Resource Control |
| RRU | Remote Radio Unit |
| RSRP | Reference Signal Received Power |
| RSRQ | Reference Signal Received Quality |
| RSSI | Received Signal Strength Indicator |
| RTT | Round-Trip Time |
| SA | Standalone |
| SCP | Service Communication Proxy |
| SMF | Session Management Function |
| SMS | Short Message Service |
| SOC | Security Operations Center |
| TCP | Transmission Control Protocol |
| TDMA | Time Division Multiple Access |
| TOA | Time of Arrival |
| UDP | User Datagram Protocol |
| UDM | User Data Management Function |
| UE | User Equipment |
| ViNR | First Video over New Radio |
| VoNR | Voice over New Radio |
| VoLTE | Voice over LTE |
| WiMAX | Worldwide Interoperability for Microwave Access |

In addition, words such as "a" and "an," unless otherwise indicated to the contrary, may also include the plural as well as the singular. Thus, for example, the constraint of "a feature" is satisfied where one or more features are present. As such, an element in the singular may refer to "one or more."

Further, the term "or" includes the conjunctive, the disjunctive, and both (a or b thus includes either a or b, as well as a and b).

In addition, the term "some" may refer to "one or more."

The term "combination" (e.g., one or more combinations thereof) may refer to, for example, "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

The term "communicating" (e.g., the user device communicating, a server communicating) may refer to, for example, receiving or transmitting a signal, data, a message, another type of communication, or one or more combinations thereof.

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Additionally, "user device," as used herein, is a device that has the capability of using a wireless telecommunications network, and may also be referred to as a "computing device," "mobile device," "user equipment" (UE), or "wireless communication device." A user device, in some aspects, may take on a variety of forms, such as a PC, a laptop computer, a tablet, a mobile phone, a PDA, a server, an Internet of Things device, any other device capable of communicating with other devices (e.g., by transmitting or receiving a signal) using a wireless communication, or one or more combinations thereof. A user device may be, in an embodiment, similar to user device 102 described herein with respect to FIG. 1. A user device may also be, in another embodiment, similar to user device 300, described herein with respect to FIG. 3.

As noted above, the user device may include Internet of Things devices, such as one or more of the following: a sensor (e.g., a temperature sensor), controller (e.g., a lighting controller, a thermostat), an appliance (e.g., a smart refrigerator, a smart air conditioner, a smart alarm system), other Internet of Things devices, or one or more combinations thereof. Internet of Things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, a drone, a remote weather station, another wireless communication device, or one or more combinations thereof.

In embodiments, a user device discussed herein may be configured to communicate using one or more of 4G (e.g., LTE), 5G, 6G, another generation communication system, or a combination thereof. In some aspects, the UE has a radio that connects with a 4G cell site but is not capable of connecting with a higher generation communication system. In some aspects, the UE has components to establish a 5G connection with a 5G gNB, and to be served according to 5G over that connection. In some aspects, the user device may be an E-UTRAN New Radio—Dual Connectivity (ENDC) device. ENDC allows a user device to connect to an LTE eNB that acts as a master node and a 5G gNB that acts as a secondary node. As such, in these embodiments, the ENDC device may access both LTE and 5G simultaneously, and in some cases, on the same spectrum band.

As used herein, the term "cell site" generally refers to one or more cellular base stations, nodes, RRUs control components, other components configured to provide a wireless interface between a wired network and a wirelessly connected user device, or a combination thereof. A cell site may comprise one or more nodes (e.g., eNB, gNB, other nodes, or one or more combinations thereof) that are configured to communicate with user devices. In some aspects, the cell site may include one or more band pass filters, radios, antenna arrays, power amplifiers, transmitters/receivers, digital signal processors, control electronics, GPS equipment, other equipment, or a combination thereof. A cell site or a node (e.g., eNB or gNB) corresponding to the cell site may comprise one or more of a macro base station, a small cell or femtocell base station, a relay base station, another type of base station, or one or more combinations thereof. In aspects, the cell site may be configured as FD-MIMO, massive MIMO, MU-MIMO, cooperative MIMO, 3G, 4G, 5G, 6G, another generation communication system, or one or more combinations thereof. In addition, the cell site may operate in an extremely high frequency region of the spectrum (e.g., from 30 GHz to 300 GHz), also known as the millimeter band.

A "telecommunication service" may refer to a satellite communication service, a microwave communication service, a millimeter wave communication service, a voice service (e.g., VoIP, an audio conferencing service), a messaging service (e.g., SMS messages, MMS messages, instant messaging messages, an EMS service messages), a data service (e.g., an internet service, an emailing service, a file transferring service), a wireless service through a wireless network, a cloud-based service, a managed service operated by a particular provider (e.g., a managed network service, a managed security service, a managed hosting service), other types of telecommunication services, or one or more combinations thereof.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have encountered various issues with respect to heartbeat detections in an SOC. For example, heartbeats allow the system to monitor and detect the operational functionality and operational availability within the SOC. When heartbeats are not detected during a monitoring process, the system can encounter monitoring gaps and blindness to an anomaly or a technical issue (e.g., security issues, a system failure, delayed incident detection and response, etc.). As another example, organizations utilizing the SOC services could experience hindered operations and organizational damages based on disruptions in the services. Without proper heartbeat detections and corresponding notifications, system failures or crashes can occur with extended downtime and prolonged recovery time.

The technology discussed herein can alleviate the problems and shortcomings discussed above. For example, the technology discussed herein can increase the quality of services provided to organization or user devices, enhance session management, enhance network resource allocation, increase the quality of user device experiences, increase incident detection and response time (e.g., by re-allocating detection resources based on more efficient notifications), and reduce recovery time, among other improvements. In one embodiment, a system for system for Security Operations Center (SOC) operations in a standalone architecture is provided. For example, the system may comprise a producer that communicates with a first Network Repository Function (NRF) and a second NRF over a network repository function service-based interface, and one or more processors corresponding to the producer, the one or more processors configured to perform operations. The operations may comprise monitoring heartbeats transmitted by the first NRF based on a registration of the first NRF. The operations may also comprise receiving, from the first NRF over the network repository function service-based interface, a notification that the first NRF is out-of-service. Based on receiving the notification from the first NRF that the first NRF is out-of-service, the operations may also comprise suspending the monitoring of the heartbeats transmitted by the first NRF. Based on receiving the notification from the first NRF that the first NRF is out-of-service, the operations may also comprise monitoring heartbeats transmitted by the second NRF.

In another embodiment, a method is provided for Security Operations Center (SOC) operations in a standalone architecture. The method may comprise transmitting, by a Network Repository Function (NRF) and over a network repository function service-based interface, a heartbeat to a producer that is configured to communicate with the NRF over the network repository function service-based interface. The method may also comprise determining, by the NRF, to transmit a notification of being out-of-service to the producer. The method may also comprise transmitting, by the NRF, the notification of being out-of-service to the producer. Upon determining that the out-of-service time period is ending, the method may also comprise transmitting, by the NRF, a second notification to the producer that the NRF is in-service.

Another embodiment may comprise one or more non-transitory computer storage media having computer-executable instructions embodied thereon, that when executed by at least one processor, cause the at least one processor to perform a method for Security Operations Center (SOC) operations in a standalone architecture. For example, the method may comprise monitoring, by a producer that communicates with a first Network Repository Function (NRF) and a second NRF over a network repository function service-based interface, heartbeats transmitted by the first NRF and the second NRF based on a first registration of the first NRF and a second registration of the second NRF. The method may also comprise receiving, from the first NRF over the network repository function service-based interface, a first notification that the first NRF is out-of-service. Based on receiving the first notification from the first NRF that the first NRF is out-of-service, the method may also comprise suspending the monitoring of the heartbeats transmitted by the first NRF.

Turning now to FIG. 1, example environment 100 comprises user device 102, cell site 104, network 108, SOC 110, and satellite 124. The SOC 110 comprises servers 112A-112C, database 114, and a producer 116 configured to communicate with the first NRF 118A, the second NRF 118B, and the third NRF 118C. Example environment 100 is but one example of a suitable environment for SOC operations in a standalone architecture, and is not intended to suggest any limitation as to the scope of use or functionality of the invention. Neither should the environment 100 be interpreted as having any dependency or requirement relating to any one or combination of components illustrated. As an example, the SOC 110 may include additional databases for storing and managing data for SOC operations, switches, routers, firewalls, load balancers, other network equipment, or one or more combinations thereof.

In embodiments, user device 102 may include one or more of a unit, a station, a terminal, a client, etc., or one or more combinations thereof. In some embodiments, user device 102 may include a wireless local loop station, an IoT device, an Internet of Everything device, a machine type communication device, an evolved or enhanced machine type communication device, another type of user device, or one or more combinations thereof. The user device 102 (e.g., the machine type communication device or the evolved or enhanced machine type communication device) may include, for example, one or more robots, drones, remote devices, sensors, meters, monitors, location tags, etc., that may communicate with cell site 104, another device (e.g., a network component of the SOC 110), or some other entity (e.g., another satellite not depicted). In some embodiments, user device 102 may be implemented in various objects such as appliances, vehicles, meters, or other objects. In some embodiments, user device 102 may, at one time or another, act as a relay, base station, (e.g., an unmanned aerial vehicle acting as an aerial base station), or other network components (e.g., macro eNBs or gNBs, small cell eNBs or gNBs, or relay base stations). As such, in some embodiments, one or more signals transmitted from the unit, station, terminal, client, wireless local loop station, IoT device, Internet of Everything device, machine type communication device, evolved or enhanced machine type communication device, user device implemented in an object, another type of user device, or one or more combinations thereof, can be received by one or more of the cell site 104, the satellite 124, the servers 112A-112C, another component of the SOC 110, or one or more combinations thereof.

As depicted by example environment 100, user device 102 (as well as additional user devices) may wirelessly communicate via network 108. User device 102 can communicate using one or more wireless communication standards. For example, the user device 102 may be configured to communicate using a wireless networking (e.g., Wi-Fi) or one or more peer-to-peer wireless communication protocols (e.g., Bluetooth, Wi-Fi peer-to-peer, other peer-to-peer protocols, or one or more combinations thereof) in addition to at least one cellular communication protocol (e.g., GSM, UMTS (associated with WCDMA or TD-SCDMA air interfaces, for example), LTE, LTE-A, 5G NR, HSPA, 3GPP2 CDMA2000 (e.g., 1×RTT, 1×EV-DO, HRPD, eHRPD), other cellular communication protocols, or one or more combinations thereof). The user device 102 may additionally or alternatively communicate using one or more global navigational satellite systems (GNSS, such as GPS or GLO- NASS for example), one or more mobile television broadcasting standards (e.g., ATSC-M/H or DVB-H), another wireless communication protocol, or one or more combinations thereof. In some embodiments, the user device 102 may include separate transmit or receive chains (e.g., including separate antennas and other radio components) for each wireless communication protocol with which it is configured to communicate.

The network 108 may provide one or more telecommunication services via the cell site 104, the satellite 124, or one or more combinations thereof. The one or more telecommunication services may include, for example, the transfer of information without the use of an electrical conductor as the transferring medium. A wireless telecommunication service may correspond to the transfer of information via radio waves (e.g., Bluetooth®), satellite communication, infrared communication, microwave communication, Wi-Fi, millimeter wave communication, mobile communication, another type of communication, or a combination thereof. In embodiments, the telecommunication service may include one or more of a voice service (e.g., VoNR), a message service (e.g., SMS messages, MMS messages, instant messaging messages, an EMS service messages), a data service, other types of wireless telecommunication services, or a combination thereof. In embodiments, the one or more telecommunication services may be provided by one or more communication providers. For example, user device 102 may correspond to a user who is registered or subscribed to a first telecommunication service provider to utilize one or more telecommunication services.

In some embodiments, the example operating environment 100 may support enhanced broadband communications, ultra-reliable (e.g., mission critical) communications, low latency communications, communications with low-cost and low-complexity devices, another type of communication, or one or more combinations thereof. In some embodiments, one or more communications between one or more user devices or communications between network components of the SOC 110 may correspond to the enhanced broadband communication, ultra-reliable communication, low latency communication, another type of communication, or one or more combinations thereof. For example, a service provided by the SOC 110 over the network 108 (e.g., a security monitoring service, a vulnerability assessment service, a compliance service, another type of SOC service) may be associated with the enhanced broadband communication, ultra-reliable communication, low latency communication, another type of communication, or one or more combinations thereof.

In embodiments, example environment 100 can utilize both licensed and unlicensed radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, cell site 104, SOC 110, satellite 124, user device 102, another network component, or one or more combinations thereof, may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof. As such, one or more communications-between cell site 104, SOC 110, user device 102, satellite 124, another network component, or one or more combinations thereof—may correspond to a licensed or unlicensed radio frequency band, a 5 GHz industrial band, a 5 GHz scientific band, a 5 GHz medical band, a particular carrier aggregation configuration of a licensed band, a P2P transmission, a D2D transmission, another type of spectrum operation, or one or more combinations thereof. As one example, one or more components of the SOC 110 (e.g., servers 112A-112C) may transmit one or more of the sets of data over the network 108 via the licensed or unlicensed radio frequency band, the 5 GHz industrial band, the 5 GHz scientific band, the 5 GHz medical band, the particular carrier aggregation configuration of a licensed band, the P2P transmission, the D2D transmission, another type of spectrum operation, or one or more combinations thereof.

In embodiments, the network 108 may correspond to one or more of 3G, 4G, 5G, 6G, another generation communication system, 802.11, millimeter waves, FD-MIMO, massive MIMO, MU-MIMO, cooperative MIMO, another type of communication system, or one or more combinations thereof. Additionally, other wireless communication protocols may be utilized in conjunction with aspects described herein. For example, embodiments of the present technology may be used with one or more wireless communication protocols or standards, including, but not limited to, CDMA 1×Advanced, GPRS, Ev-DO, TDMA, GSM, WiMAX technology, LTE, LTE Advanced, other technologies and standards, or one or more combinations thereof. As such, one or more communications—between cell site 104, SOC 110, user device 102, satellite 124, another network component, or one or more combinations thereof—may correspond to one or more of 3G, 4G, 5G, 6G, another generation communication system, 802.11, millimeter wave communication, FD-MIMO, massive MIMO, MU-MIMO, cooperative MIMO, another type of communication protocol, one or more wireless communication protocols or standards (e.g., CDMA 1×Advanced, GPRS, Ev-DO, TDMA, GSM, WiMAX technology, LTE, LTE Advanced, other technologies and standards), or one or more combinations thereof.

In embodiments, cell site 104 can provide the one or more wireless communication services via network 108, the network 108 comprising one or more telecommunication networks, or a portion thereof. A telecommunication network might include an array of devices or components (e.g., one or more cell sites 104). The network 108 can include multiple networks, and the network can be a network of networks. In embodiments, the network 108 is a core network, such as an evolved packet core, which may include at least one MME, at least one serving gateway, and at least one Packet Data Network gateway. The MME may manage non-access stratum (e.g., control plane) functions such as mobility, authentication, and bearer management for other devices associated with the evolved packet core. In an embodiment, the network 108 comprises at least two core networks associated with a legacy LTE network and a 5G network. The at least two core networks may each operate one or more public land mobile networks, which may operate in each of the at least two core networks (e.g., one public land mobile network operates in each of an evolved packet core and a 5G core network). In embodiments, different core networks may be provided for different types of services, for different types of customers, for different types of traffic, to provide different levels of Quality of Service, or one or more combinations thereof. The network 108 can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the network 108, such as terminals, links, and nodes (as well as other components), can provide connectivity in various implementations. For example, components of the network 108 may include core network nodes, relay devices, integrated access and backhaul nodes, macro eNBs, small cell eNBs, gNBs, relay cell sites, satellites, other network components, or a combination thereof. The network 108 may interface with one or more cell sites through one or more wired or wireless backhauls. Furthermore, user devices can utilize the network 108 to communicate with other devices (e.g., a user device(s), a server(s), etc.) through one or more of cell site 104 or satellite 124.

The cell site 104 may include one or more cells, band pass filters, radios, antennas, antenna arrays, power amplifiers, transmitters/receivers, digital signal processors, control electronics, GPS equipment, and the like. In some aspects, the cell site 104 may comprise one or more macro cells (providing wireless coverage for users within a large geographic area). For example, macro cells may correspond to a coverage area having a radius of approximately 1-15 miles or more, the radius measured at ground level and extending outward from an antenna at the cell site. In some aspects, cell site 104 may comprise, or be in communication with, one or more small cells (providing wireless coverage for users within a small geographic area). For example, a small cell may correspond to a coverage area having a radius of approximately less than three miles, the radius measured at ground level and extending outward from an antenna at the cell site.

In embodiments, satellite 124 may communicate with the cell site 104, user device 102, SOC 110, another network component, or one or more combinations thereof. In some embodiments, satellite 124 may include a space vehicle or communication satellite. Satellite 124 may be any suitable type of communication satellite configured to relay communications between different devices within environment 100. Satellite 124 may be or include a space satellite, a balloon, a dirigible, an airplane, a drone, an unmanned aerial vehicle, another type of satellite, or one or more combinations thereof. In some examples, the satellite 124 may be in a geosynchronous or geostationary earth orbit, a low earth orbit, a medium earth orbit, another type of orbit, or one or more combinations thereof. In some embodiments, satellite 124 may be a multi-beam satellite configured to provide service for multiple service beam coverage areas in a predefined geographical service area. The satellite 124 may be any distance away from the surface of the earth. In one non-limiting example, satellite 124 may correspond to a geosynchronous earth orbiting satellite or may have a satellite operating configuration corresponding to multiple service beam coverage areas in a predefined geographical service area.

In some embodiments, the SOC 110 can receive information from or transmit information to one or more of the user device 102 via satellite 124 (e.g., the space satellite, balloon, dirigible, airplane, drone, unmanned aerial vehicle, multi-beam satellite, another type of satellite, or one or more combinations thereof). For example, this information transmitted or received via the satellite 124 may correspond to a free space optical link, a microwave link, electromagnetic wave signals via millimeter wave signals, optical signals via a laser, another type of communication link, a wireless common public radio interface protocol, a dedicated wireless front haul protocol developed for high-altitude-to-highaltitude, another protocol, or one or more combinations thereof. In some embodiments, the satellite 124 can demodulate received information and transmit that demodulated information, decode information transmitted from the user device 102 or decode the information for the user device 102, re-encode information, modulate the information once transmitted, perform another type of satellite or regenerative transponder function on data transmitted (e.g., by the user device 102), or one or more combinations thereof.

Database 114 of the SOC 110 may include stored data received from one or more of user device 102, cell site 104, servers 112A-112C, producer 116, the first NRF 118A, the second NRF 118B, the third NRF 118C, satellite 124, another network component, or one or more combinations thereof. In some embodiments, database 114 is a centralized database including a single server. In some embodiments, database 114 is a distributed database having multiple locations that are in communication via the network of the SOC 110. In some embodiments, the database 114 includes a hierarchical database (e.g., organized in a tree-like structure having parent-child relationships between data elements). For example, heartbeats received by the producer 116 from the first NRF 118A, the second NRF 118B, or the third NRF 118C may be stored in the hierarchical database 114 as having a child relationship to data elements corresponding to registration information (e.g., a first profile in the first NRF 118A that includes a Public Land Mobile Network identifier), a status of an Service Communication Proxy instance, information corresponding to a network function instance (e.g., a Universally Unique Identifier), other types of information related to one of the NRFs 118A-118C, or one or more combinations thereof. As another example, heartbeats received by the producer 116 after an in-service notification from the first NRF 118A, the second NRF 118B, or the third NRF 118C may be stored in the hierarchical database 114 as having a child relationship to data elements corresponding to the in-service notification.

In some embodiments, the database 114 is a network database (e.g., using a network model to represent the stored data), an object-oriented database (e.g., which defines objects by class and allowing object retrieval based on attributes and relationships), an in-memory database, a spatial database, a blockchain database, a relational database (e.g., Google Cloud SQL), non-relational databases having a flexible schema design with horizontal scalability for large volumes of unstructured or semi-structured data (e.g., MongoDB), a key-value store (e.g., Redis), a document database (e.g., CouchDB), a columnar database (e.g., Apache Cassandra, Google BigQuery), a graph database (e.g., Neo4j), a time-series database (e.g., InfluxDB), another type of database, or one or more combinations thereof. In embodiments, servers 112A-112C or another network component may access, organize, or query the database 114. For example, in one embodiment, the database 114 is a columnar database having different columns for heartbeats received from each of the NRFs 118A-118C.

In embodiments, one or more of the servers 112A-112C may be a web server (e.g., having one or more server nodes for balancing load and redundancy). In embodiments, one or more of the servers 112A-112C may be an application server. In embodiments, one or more of the servers 112A-112C may be a database server (e.g., an SQL server, MySQL). In embodiments, one or more of the servers 112A-112C may be a mail server (e.g., having one or more transfer agents, having one or more mail delivery or retrieval agents). In some embodiments, one or more of the servers

112A-112C may be a proxy server (e.g., providing load balancing, access control, filtering, etc., between or among servers 112A-112C). In embodiments, servers 112A-112C may include one or more processors, memory, a data store (e.g., a hardware drive, a solid-state drive), a network interface for transmitting or receiving communications over network 108, another server component, or one or more combinations thereof. In embodiments, one or more of the servers 112A-112C may include a network switch, a router, a load balancer, a firewall, another type of network equipment, or one or more combinations thereof. In embodiments, one or more of the servers 112A-112C may include a runtime environment, a middleware component (e.g., to facilitate a messaging service for the user device 102), a web-based interface, a command-line tool, another software component, or one or more combinations thereof.

The producer 116 can communicate with the NRFs 118A-118C using the network repository function service-based interface. For example, in some embodiments, the producer 116 can be an SMF that manages sessions in a 5G standalone network environment and informs the NRFs 118A-118C about an availability or a capability of a session-related resource. In some embodiments, the producer 116 manages and controls user sessions for data services and other services within the standalone 5G network (e.g., network 108). For example, the producer 116 can provide session management, user device IP address management and allocation, policy enforcement control, quality of service control, roaming functionality, charging data collection, charging interface, other types of SMF functionalities, or one or more combinations thereof.

In embodiments, the producer 116 monitors heartbeats transmitted by the first NRF 118A (e.g., based on a registration of the first NRF), heartbeats transmitted by the second NRF 118B (e.g., based on a registration of the second NRF), or heartbeats transmitted by the third NRF 118C. For example, in some embodiments, the producer 116 can send a ping or internet control message protocol echo request to one or more of the NRFs 118A-118C, utilize a heartbeat protocol or API, utilize a simple network management protocol, operate as a centralized heartbeat monitoring system, perform other monitoring techniques, or one or more combinations thereof. In some embodiments, the producer 116 can monitor CPU utilization, memory usage, disk activity, network traffic, other NRF functional indicators, or one or more combinations thereof. In some embodiments, the producer 116 can monitor a frequency and interval of the heartbeats received by one or more of the NRFs 118A-118C and store the monitored frequency and interval in database 114. In some embodiments, the producer 116 can receive a request from one or more of the NRFs 118A-118C to monitor the heartbeats. For example, the request can include a time period between two consecutive heartbeats. In some embodiments, the producer 116 generates a log of the heartbeats received from the NRFs 118A-118C and stores the historical heartbeat data (e.g., including intervals and frequencies) in the database 114.

In some embodiments, the producer 116 can be CHF that monitors and records durations of communication sessions (e.g., voice services, data services, messaging services, multimedia services) and manages subscriber data corresponding to a first telecommunication service provider, wherein the subscriber utilizes one or more telecommunication services provided by the telecommunication service provider. In some embodiments, the CHF provider can track usage patterns, charging activities (e.g., when a user device is utilize the one or more telecommunication services provided by the telecommunication service provider), and perform other types of tracking that can be stored in the database 114. In some embodiments, the producer 116 can be a PCF that enforces policies for a network operator or telecommunication service provider. In some embodiments, the producer 116 is an Access and Mobility Management Function that can manage access control and mobility functions for user devices utilizing the network 108. In some embodiments, the producer 116 is an Authentication Server Function that manages authentication and key management for user devices within the 5G standalone environment. For example, the Authentication Server Function can generate authentication vectors that are utilized for authentication procedures and establishing secure connections. In some embodiments, the producer 116 is a Network Exposure Function that enables exposure and access to network services or capabilities for third-party applications or service providers. For example, the Network Exposure Function can manage APIs and provide security and authentication of API requests.

In some embodiments, the producer 116 is a User Data Management Function that manages and stores user device data. For example, the User Data Management Function can maintain user device identifiers, manage user subscription profiles for user device access to one or more telecommunication services, and provide various access rights and permissions to user devices. In some embodiments, the producer 116 is a Session Management Function that manages and controls data sessions for user devices (e.g., PDU session establishment, data flow control, quality of service enforcement, PDU session binding with network slice instances, PDU session binding with virtual network instances, other types of session management functions, or one or more combinations thereof.

In embodiments, the producer 116 can receive, from one or more of the NRFs 118A-118C over the network repository function service-based interface, a notification that one or more of the NRFs 118A-118C is out-of-service. For example, in some embodiments, the first NRF 118A transmits the notification that the first NRF 118A is out-of-service subsequent to registering itself with the first NRF 118A and subsequent to notifying the producer 116 of the registration. In some embodiments, the first NRF 118A transmits the notification that the first NRF 118A is out-of-service to one or more other producers in addition to transmitting it to the producer 116. In some embodiments, the notification that the first NRF 118A is out-of-service includes a network function instance identifier (e.g., a Universally Unique Identifier), a location header, other types of information corresponding to the first NRF 118A, or one or more combinations thereof. In some embodiments, the notification that the first NRF 118A is out-of-service includes an expected out-of-service time period duration. As another example, in some embodiments, the second NRF 118B transmits the notification that the second NRF 118B is out-of-service to the producer 116 or the third NRF 118C transmits the notification that the third NRF 118C is out-of-service to the producer 116. In some embodiments, the notifications from the second NRF 118B or the third NRF 118C include the expected out-of-service time period duration.

Based on receiving the notification from the first NRF 118A that the first NRF 118A is out-of-service, the producer 116 can suspend the monitoring of the heartbeats transmitted by the first NRF 118A. In this way, the producer 116 can allocate heartbeat monitoring resources for other components within the 5G standalone environment without incorrectly determining that first NRF 118A has an issue or requires additional resources. Additionally, the producer 116 can suspend the monitoring of the heartbeats transmitted by the second NRF 118B in response to receiving the notification from second NRF 118B that the second NRF 118B is out-of-service. In addition, the producer 116 can suspend the monitoring of the heartbeats transmitted by the third NRF 118C in response to receiving the notification from third NRF 118C that the third NRF 118C is out-of-service.

In some embodiments, in response to suspending the monitoring of the heartbeats transmitted by the first NRF 118A, the producer 116 can allocation one or more additional resources to monitoring the heartbeats transmitted by the second NRF 118B, the third NRF 118C, another NRF, or one or more combinations thereof. In some embodiments, in response to suspending the monitoring of the heartbeats transmitted by the second NRF 118B, the producer 116 can allocation one or more additional resources to monitoring the heartbeats transmitted by the first NRF 118A, the third NRF 118C, another NRF, or one or more combinations thereof. In some embodiments, in response to suspending the monitoring of the heartbeats transmitted by the third NRF 118C, the producer 116 can allocation one or more additional resources to monitoring the heartbeats transmitted by the first NRF 118A, the second NRF 118B, another NRF, or one or more combinations thereof. In some embodiments wherein the producer receives the notification that the first NRF 118A is out-of-service and has not yet initiated monitoring of the second NRF 118B or the third NRF 118C, the producer 116 can initiate the monitoring of heartbeats transmitted by the second NRF 118B or the third NRF 118C.

In some embodiments, the producer 116 can also receive another notification, from one or more of the NRFs 118A-118C over the network repository function service-based interface, indicating that the first NRF 118A, the second NRF 118B, the third NRF 118C, or another NRF, is in-service. In some embodiments, the notification indicating that the first NRF 118A, the second NRF 118B, the third NRF 118C, or another NRF, is in-service can include a time period between two consecutive heartbeats. In some embodiments, the notification indicating that the first NRF 118A, the second NRF 118B, the third NRF 118C, or another NRF, is in-service can include a first time period between two consecutive heartbeats for a first time range and a second time period between two consecutive heartbeats for a second and subsequent time range. In embodiments, based on receiving the notification from the first NRF 118A that the first NRF 118A is in-service, the producer 116 can resume the monitoring of the heartbeats transmitted by the first NRF 118A (e.g., based on the first time period between two consecutive heartbeats for the first time range and the second time period between two consecutive heartbeats for the second and subsequent time range). In embodiments, based on receiving the notification that the second NRF 118B is in-service, the producer 116 can resume the monitoring of the heartbeats transmitted by the second NRF 118B. In some embodiments, the producer 116 can simultaneously resume the monitoring of the heartbeats transmitted by the first NRF 118A and the second NRF 118B.

Figure 2:
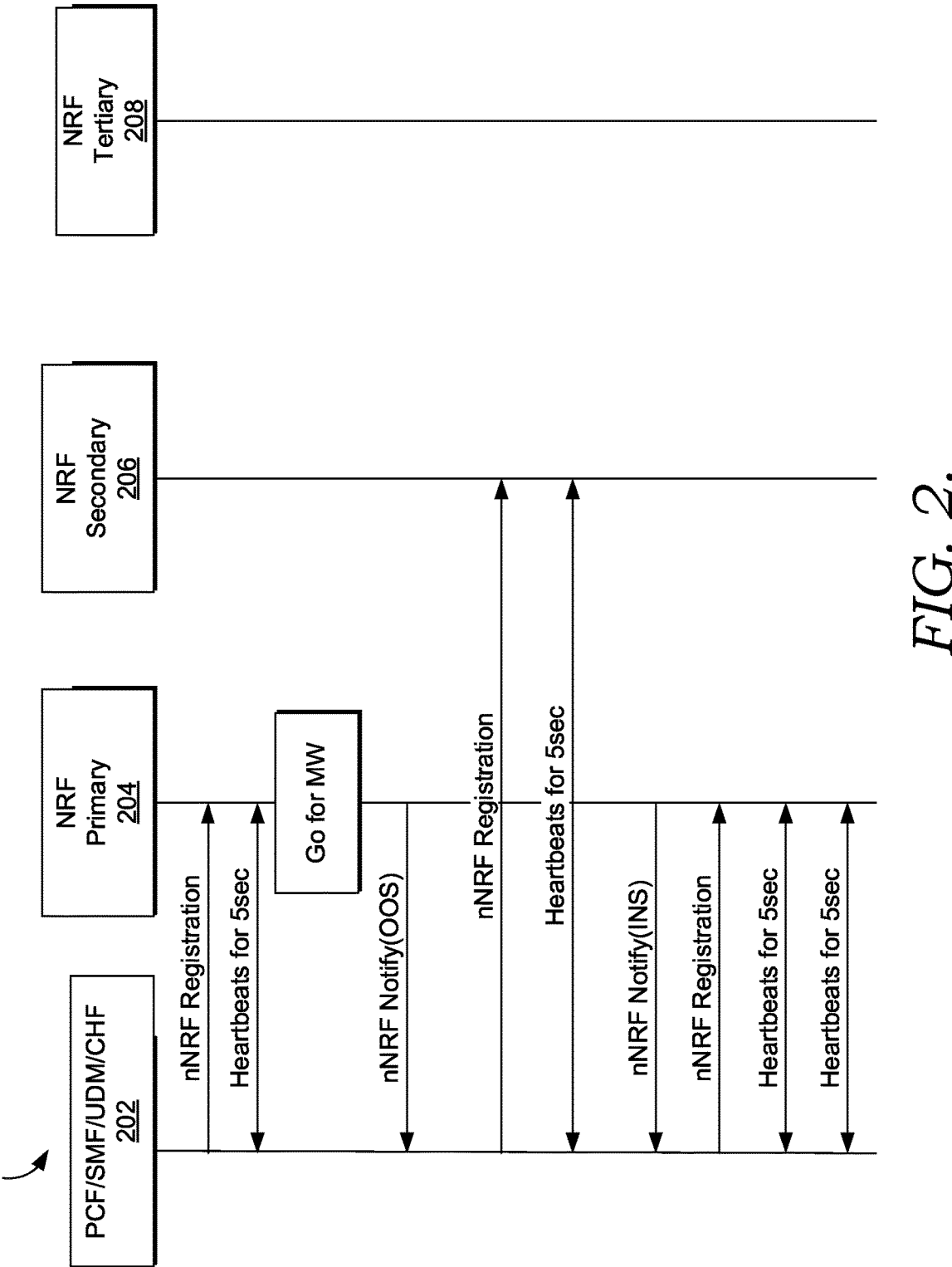
FIG. 2 illustrates an example operational diagram for the SOC operations in the standalone architecture, in accordance with embodiments herein.

FIG. 2 illustrates an example operational diagram 200 for the SOC operations in the standalone architecture. Example operational diagram 200 includes producer 202 (e.g., a Policy Control Function, a Session Management Function, a User Data Management Function, a Charging Function, an Access and Mobility Management Function, a Network Exposure Function, an Authentication Server Function), primary NRF 204, secondary NRF 206, and tertiary NRF 208. Example operational diagram 200 is but one example of a suitable environment for SOC operations in a stand-alone architecture, and is not intended to suggest any limitation as to the scope of use or functionality of the invention. Neither should the operational diagram 200 be interpreted as having any particular dependency or requirement relating to any one or combination of components illustrated. As an example, operational diagram 200 may include additional NRFs.

In embodiments, the producer 202 transmits an nNRF registration to the primary NRF 204. For example, the primary NRF 204 can maintain the NF profile of available NF instances and supported services, maintain an SCP profile of available SCP instances, and allow components of the SOC to receive notifications of the registrations in the primary NRF 204 of the new SCP instances. In embodiments, the nNRF transmitted by the producer 202 can allow an NRF instance to register, update, or deregister its profile in another NRF in the same PLMN. Based on the nNRF registration, the producer 202 monitors the heartbeats received from the primary NRF 204 (e.g., wherein the heartbeats are received from the primary NRF 204 in five second intervals). For example, the primary NRF 204 can transmit one or more heartbeats over a network repository function service-based interface to the producer 202, wherein the time period between two consecutive heartbeats transmitted by the primary NRF 204 is five seconds.

In embodiments, the primary NRF 204 can initiate maintenance work. For example, in some embodiments, the primary NRF 204 can transmit a notification to the producer 202 that indicates the primary NRF 204 will be out-of-service based on the initiation of the maintenance work. In some embodiments, the notification that indicates the primary NRF 204 will be out-of-service may include an expected unavailability time period or one or more services provided by the primary NRF 204 that will be unavailable for an expected time period. In some embodiments, the primary NRF 204 can initiate a handover process to one or more of the secondary NRF 206 and tertiary NRF 208 based on the initiation of the maintenance work. In other embodiments, the secondary NRF 206 or the tertiary NRF 208 can initiate maintenance work and transmit a notification to the producer 202 that indicates the secondary NRF 206 or the tertiary NRF 208 will be out-of-service based on the initiation of the maintenance work.

Based on the primary NRF 204 transmitting the notification to the producer 202 that indicates the primary NRF 204 will be out-of-service, the producer 202 can initiate an nNRF registration (e.g., based on a Public Land Mobile Network identifier) with the secondary NRF 206. Based on the notification from the primary NRF 204 and the registration with the secondary NRF 206, the producer 202 can receive heartbeats from the secondary NRF 206. Stated differently, while the producer 202 has suspended the monitoring of the primary NRF 204 and based on the nNRF registration of the secondary NRF 206, the producer 202 monitors the heartbeats received from the secondary NRF 206 (e.g., wherein the heartbeats are received from the secondary NRF 206 in five second intervals). For example, the secondary NRF 206 can transmit one or more heartbeats over a network repository function service-based interface to the producer 202, wherein the time period between two consecutive heartbeats transmitted by the secondary NRF 206 is five seconds.

In other embodiments, based on both the primary NRF 204 transmitting the notification to the producer 202 that indicates the primary NRF 204 will be out-of-service and the secondary NRF 206 transmitting the notification to the producer 202 that indicates the secondary NRF 206 will be out-of-service, the producer 202 can initiate an nNRF registration (e.g., based on a Public Land Mobile Network identifier) with the tertiary NRF 208. Based on the notification from the primary NRF 204, the notification from the secondary NRF 206, and the registration with the tertiary NRF 208, the producer 202 can receive heartbeats from the tertiary NRF 208. Stated differently, while the producer 202 has suspended the heartbeat monitoring of the primary NRF 204 and secondary NRF 206, and based on the nNRF registration of the tertiary NRF 208, the producer 202 monitors the heartbeats received from the tertiary NRF 208 (e.g., wherein the heartbeats are received from the tertiary NRF 208 in five second intervals). For example, the tertiary NRF 208 can transmit one or more heartbeats over a network repository function service-based interface to the producer 202, wherein the time period between two consecutive heartbeats transmitted by the tertiary NRF 208 is five seconds.

In embodiments, the primary NRF 204 can transmit another notification to the producer 202 indicating that the primary NRF 204 is in-service. For example, the primary NRF 204 can transmit the notification that the primary NRF 204 is in-service over the network repository function service-based interface based on the out-of-service time period ending for the primary NRF 204. In some embodiments, the primary NRF 204 can transmit the notification that the primary NRF 204 is in-service to another producer different than the producer 202. For example, in some embodiments, the producer 202 is a CHF and the different producer is Access and Mobility Management Function. As another example, the producer 202 may be a PCF and the different producer may be a CF. In yet another example, the producer 202 may be a Network Exposure Function and the different producer may be an Authentication Server Function. Further, the primary NRF 204 can reregister via an nNRF registration initiated by the producer 202 in response to transmitting the notification to the producer 202 that the primary NRF 204 is in-service after the out-of-service time period has ended. Based on the notification that the primary NRF 204 is in-service and based on the reregistration of the primary NRF 204, the producer 202 can resume the monitoring of the heartbeats transmitted by the primary NRF 204. For example, in some embodiments, the primary NRF 204 can transmit a plurality of heartbeats, wherein the time period between two consecutive heartbeats is five seconds. In some embodiments, the producer 202 resumes monitoring of the heartbeats from the primary NRF 204 based on receiving a heartbeat request (e.g., corresponding to a frequency of the heartbeats to be transmitted by the primary NRF 204) from the primary NRF 204.

In other embodiments, the secondary NRF 206 can also transmit another notification to the producer 202 indicating that the secondary NRF 206 is in-service based on the out-of-service time period ending for the secondary NRF 206. In some embodiments, the secondary NRF 206 can transmit the notification that the secondary NRF 206 is in-service to another producer different than the producer 202. Further, the secondary NRF 206 can reregister via an nNRF registration initiated by the producer 202 in response to transmitting the notification to the producer 202 that the secondary NRF 206 is in-service after the out-of-service time period has ended. Based on the notification that the secondary NRF 206 is in-service and based on the reregistration of the secondary NRF 206, the producer 202 can resume the monitoring of the heartbeats transmitted by the secondary NRF 206. For example, in some embodiments, the secondary NRF 206 can transmit a plurality of heart-beats, wherein the time period between two consecutive heartbeats is five seconds.

Example User Device

Having described the example embodiments discussed above of the presently disclosed technology, an example operating environment of an example user device (e.g., user device 102 of FIG. 1) is described below with respect to FIG. 3. User device 300 is but one example of a suitable computing environment and is not intended to suggest any particular limitation as to the scope of use or functionality of the technology disclosed. Neither should user device 300 be interpreted as having any dependency or requirement relating to any particular component illustrated, or a particular combination of the components illustrated in FIG. 3.

Figure 3:
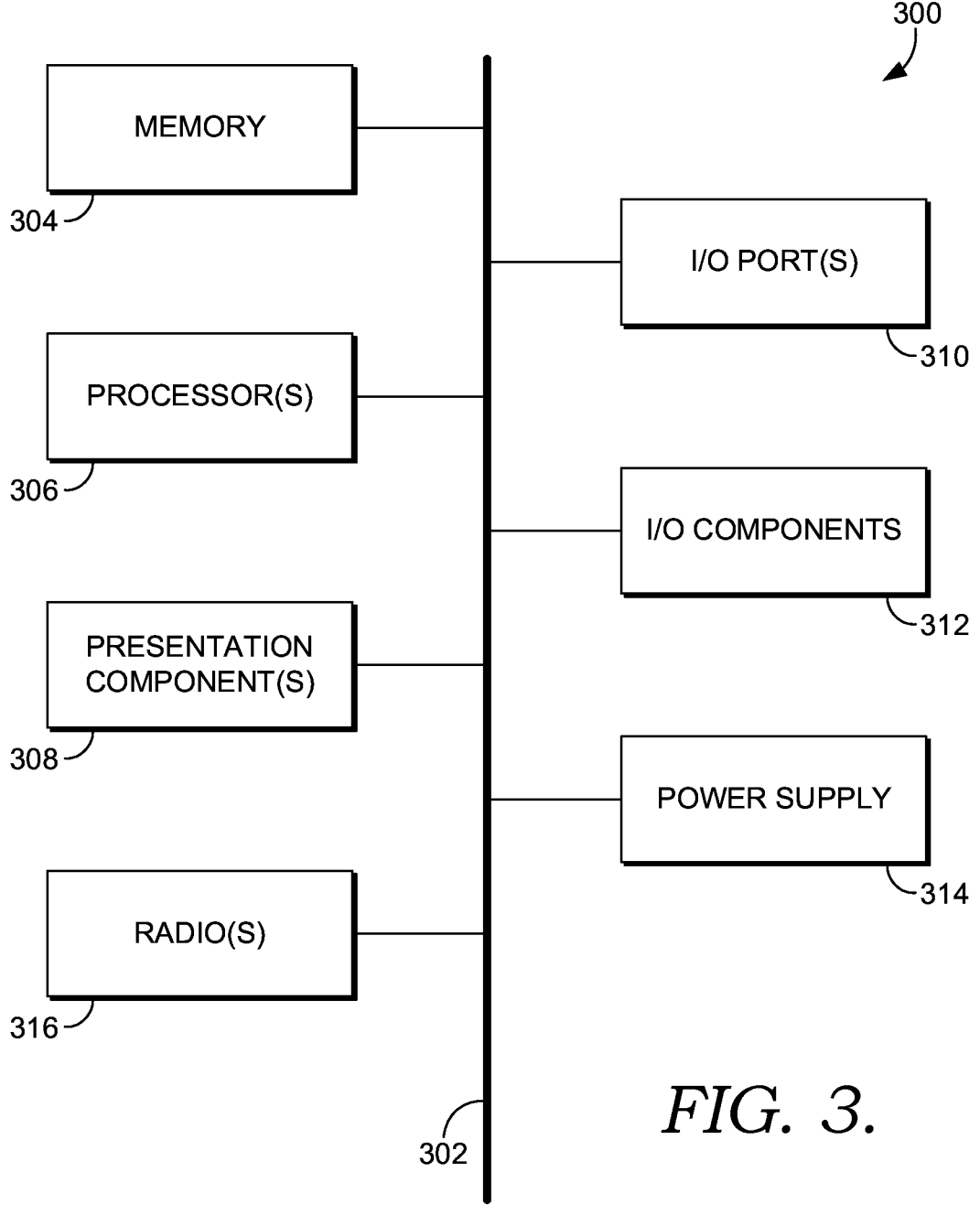
FIG. 3 depicts an example user device suitable for use in implementations of the present disclosure, in accordance with aspects herein.

As illustrated in FIG. 3, example user device 300 includes a bus 302 that directly or indirectly couples the following devices: memory 304, one or more processors 306, one or more presentation components 308, one or more input/output (I/O) ports 310, one or more I/O components 312, a power supply 314, and one or more radios 316.

Bus 302 represents what may be one or more busses (such as an address bus, data bus, or combination thereof). Although the various blocks of FIG. 3 are shown with lines for the sake of clarity, in reality, these blocks represent logical, not necessarily actual, components. For example, one may consider a presentation component, such as a display device, to be an I/O component. Also, processors have memory. Accordingly, FIG. 3 is merely illustrative of an exemplary user device that can be used in connection with one or more embodiments of the technology disclosed herein.

User device 300 can include a variety of computer-readable media. Computer-readable media can be any available media that can be accessed by user device 300 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 300. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 304 includes computer storage media in the form of volatile and/or nonvolatile memory. The memory 304 may be removable, non-removable, or a combination thereof. Example hardware devices of memory 304 may include solid-state memory, hard drives, optical-disc drives, other hardware, or one or more combinations thereof. As indicated above, the computer storage media of the memory 304 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 300, or one or more combinations thereof.

The one or more processors 306 of user device 300 can read data from various entities, such as the memory 304 or the I/O component(s) 312. The one or more processors 306 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 306 can execute instructions (e.g., instructions received by the one or more servers 112A-112C of FIG. 1), for example, of an operating system of the user device 300 or of one or more suitable applications.

The one or more presentation components 308 can present data indications via user device 300, another user device, or a combination thereof. Example presentation components 308 may include a display device, speaker, printing component, vibrating component, another type of presentation component, or one or more combinations thereof. In some embodiments, the one or more presentation components 308 may comprise one or more applications or services on a user device, across a plurality of user devices, or in the cloud. The one or more presentation components 308 can generate user interface features, the interface features including one or more of graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 310 allow user device 300 to be logically coupled to other devices, including the one or more I/O components 312, some of which may be built in. Example I/O components 312 can include a microphone, joystick, game pad, satellite dish, scanner, printer, wireless device, and the like. The one or more I/O components 312 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 308 on the user device 300. In some embodiments, the user device 300 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 300 may, additionally or alternatively, be equipped with accelerometers or gyroscopes that enable detection of motion. In some embodiments, the output of the accelerometers or gyroscopes may be provided to the one or more presentation components 308 of the user device 300 to render immersive augmented reality or virtual reality.

The power supply 314 of user device 300 may be implemented as one or more batteries or another power source for providing power to components of the user device 300. In embodiments, the power supply 314 can include an external power supply, such as an AC adapter or a powered docking cradle that supplements or recharges the one or more batteries. In aspects, the external power supply can override one or more batteries or another type of power source located within the user device 300.

Some embodiments of user device 300 may include one or more radios 316 (or similar wireless communication components). The one or more radios 316 can transmit, receive, or both transmit and receive signals for wireless communications. In embodiments, the user device 300 may be a wireless terminal adapted to receive communications and media over various wireless networks. User device 300 may communicate using the one or more radios 316 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA), or one or more combinations thereof. In some embodiments, the one or more radios 316 may facilitate communication via radio frequency signals, frames, blocks, transmission streams, packets, messages, data items, data, another type of wireless communication, or one or more combinations thereof. The one or more radios 316 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for Security Operations Center (SOC) operations in a standalone architecture, the system comprising:
    a producer that interacts with a first Network Repository Function (NRF) and a second NRF through one or more network repository function service-based interfaces; and
    one or more processors associated with the producer, wherein the one or more processors cause the producer to perform operations comprising:
    monitoring heartbeats sent by the first NRF based on a registration of the first NRF;
    receiving, from the first NRF over the network repository function service-based interface, a notification transmitted by the first NRF indicating that the first NRF is out-of-service;
    based on receiving the notification from the first NRF indicating that the first NRF is out-of-service, suspending the monitoring of the heartbeats sent by the first NRF without deregistering the first NRF; and
    based on receiving the notification from the first NRF that the first NRF is out-of-service, monitoring heartbeats sent by the second NRF.

2. The system of claim 1, wherein the operations further comprise:
    receiving, from the first NRF over the network repository function service-based interface, a second notification that the first NRF is in-service; and
    based on receiving the second notification from the first NRF that the first NRF is in-service, resuming the monitoring of the heartbeats sent by the first NRF.

3. The system of claim 2, wherein the producer resumes the monitoring of the heartbeats sent by the first NRF further based on receiving a heartbeat request from the first NRF, the heartbeat request including a time period between two consecutive heartbeats.

4. The system of claim 1, wherein the producer is a User Data Management Function.

5. The system of claim 1, wherein the producer is a Session Management Function.

6. The system of claim 1, the operations further comprising transmitting the notification that the first NRF is out-of-service to a second producer.

7. The system of claim 6, wherein the producer is a Policy Control Function and the second producer is a Charging Function.

8. A method for Security Operations Center (SOC) operations in a standalone architecture, the method comprising:

transmitting, by a Network Repository Function (NRF) and over a network repository function service-based interface, a heartbeat to a producer that is configured to communicate with the NRF over the network repository function service-based interface;

determining, by the NRF, to transmit a notification of being out-of-service to the producer;

transmitting, by the NRF, the notification indicating that the NRF is out-of-service to the producer; and upon determining that the out-of-service time period is ending, transmitting, by the NRF, a second notification to the producer that the NRF is in-service;

wherein, based on receiving the out-of-service notification, the producer suspends monitoring of the heartbeats sent by the NRF without deregistering the NRF.

9. The method of claim 8, further comprising transmitting, by the NRF, heartbeats to the producer based on transmitting the second notification to the producer and based on a registration of the NRF in response to transmitting the second notification.

10. The method of claim 9, wherein the registration is based on a Public Land Mobile Network identifier.

11. The method of claim 8, wherein the producer is a Charging Function.

12. The method of claim 8, wherein the producer is a Policy Control Function.

13. The method of claim 8, wherein the producer is an Access and Mobility Management Function.

14. The method of claim 8, further comprising transmitting, by the NRF, the notification of being out-of-service to a second producer.

15. The method of claim 14, wherein the producer is a Network Exposure Function and the second producer is an Authentication Server Function.

16. One or more non-transitory computer storage media having computer-executable instructions embodied thereon, that when executed by at least one processor, cause the at least one processor to perform a method for Security Operations Center (SOC) operations in a standalone architecture, the method comprising:

monitoring, by a producer that communicates with a first Network Repository Function (NRF) and a second NRF over a network repository function service-based interface, heartbeats sent by the first NRF and the second NRF based on a first registration of the first NRF and a second registration of the second NRF;

receiving, from the first NRF over the network repository function service-based interface, a first notification that the first NRF is out-of-service; and based on receiving the first notification from the first NRF that the first NRF is out-of-service, suspending the monitoring of the heartbeats sent by the first NRF without deregistering the first NRF; and based on receiving the notification from the first NRF that the first NRF is out-of-service, monitoring heartbeats sent by the second NRF.

17. The non-transitory computer-readable media of claim 16, the method further comprising:

receiving, from the second NRF over the network repository function service-based interface, a second notification that the second NRF is out-of-service; and based on receiving the second notification from the second NRF that the second NRF is out-of-service, suspending the monitoring of the heartbeats sent by the second NRF.

18. The non-transitory computer-readable media of claim 17, the method further comprising:

based on receiving the first notification from the first NRF that the first NRF is out-of-service and the second notification from the second NRF that the second NRF is out-of-service, initiating a third registration with a third NRF; and based on the third registration with the third NRF, receiving, from the third NRF over the network repository function service-based interface, heartbeats.

19. The non-transitory computer-readable media of claim 17, the method further comprising transmitting the first notification from the first NRF that the first NRF is out-of-service and the second notification from the second NRF that the second NRF is out-of-service to a second producer.

20. The non-transitory computer-readable media of claim 19, wherein the second producer is an Access and Mobility Management Function.

\* \* \* \* \*